(12) United States Patent
son Åkerberg et al.

(10) Patent No.: US 6,226,528 B1
(45) Date of Patent: May 1, 2001

(54) WIRELESS MULTI-CELL RADIO TELECOMMUNICATION SYSTEM

(75) Inventors: Dag E. son Åkerberg, Kungsängen (SE); Petrus Hubertus Geradus van de Berg, Amsterdam (NL)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/017,549

(22) Filed: Feb. 2, 1998

Related U.S. Application Data

(63) Continuation of application No. PCT/EP96/03460, filed on Aug. 1, 1996.

(51) Int. Cl.⁷ .................................................... H04M 1/00
(52) U.S. Cl. ........................ 455/554; 455/7; 455/426
(58) Field of Search .................................... 455/554, 555, 455/426, 524, 445, 7, 15, 16, 17, 422

(56) References Cited

U.S. PATENT DOCUMENTS 5,890,055 * 3/1999 Chu et al. .............................. 455/16

FOREIGN PATENT DOCUMENTS

| 0 406 905 | 1/1991 | (EP) . |
| 0 637 144 | 2/1995 | (EP) . |
| WO93/06684 | 4/1993 | (WO) . |
| WO93/15565 | 8/1993 | (WO) . |
| WO94/19877 | 9/1994 | (WO) . |

OTHER PUBLICATIONS

Bonzano, Laura, et al., "A New Radio Access Strategy Using a Repeater in the DECT Radio Local Loop Application", 1994 Third Annual International Conference on Universal Personal Communication, 1994.

Brouwer, F., et al., "DECT Technology for Radio in the Local Loop", 1994 IEEE 44th Vehicular Technology Conference, Jun. 1994.

PCT Search Report, paper #5, Dec. 5, 1997.*

* cited by examiner

*Primary Examiner*—Lee Nguyen
(74) *Attorney, Agent, or Firm*—Burns, Doane, Swecker & Mathis, L.L.P.

(57) ABSTRACT

A wireless multi-cell radio telecommunication system includes a plurality of remote radio telecommunication terminals which connect through a radio air interface with a plurality of radio base stations. The base stations are designed as repeater or relay stations, and the connection between the base stations and a central control unit is established using the same interface and communication protocol provided for the connections between the terminals and the base stations. The radio interface devices of a base station may be advantageously used for both the connection between the base station and the central control unit and the connection between the base station and the terminals. The radio telecommunication system may operate in accordance with the Digital European Cordless Telecommunications (DECT) standard.

4 Claims, 2 Drawing Sheets

WIRELESS MULTI-CELL RADIO TELECOMMUNICATION SYSTEM

This application is a continuation of International Application No. PCT/EP96/03460, filed Aug. 1, 1996, which designates the United States.

BACKGROUND

The present invention relates generally to radio telecommunication systems and, more specifically, to multi-cell radio telecommunication systems for communication between two or more telecommunication units, at least one of which can be mobile.

In recent years various techniques and concepts of private and public radio telecommunication systems for telephony and data transmission have been developed. In general two types of radio telecommunication systems can be distinguished.

The first is cellular communication, providing coverage over a relatively wide area, i.e. relatively large cells. Analogue cellular systems, such as designated AMPS, ETACS, NMT-450 and NMT-900 have been deployed throughout the world. Digital cellular systems are designated IS-54B in North, America and the pan-European GSM system.

The second is cordless communication, ranging from simple single-cell residential cordless telephones to multi-cell business cordless systems capable of serving hundreds or even; thousands of cordless communication units across (large) offices, production halls etc. Analogue cordless telephones are designated CT0, CT1 and CT1+. Amongst the digital cordless systems, designated CT2, CT2-CAI, CT3 and DECT (Digital. Enhanced Cordless Telecommunications), both CT3 and DECT use TDMA (Time Division Multiple Access) as their transmission technique, whereas CT2 operates under FDMA (Frequency Division Multiple Access). Besides these access techniques, in particular in North America, spread spectrum access is used for cordless communication. CDMA (Code Division Multiple Access) is another digital access technique which can be used for cordless communication.

Some of the cordless technologies can also be used to provide a type of Personal Communication Services (PCS) or also called Cordless Terminal Mobility (CTM). This is basically a multi-cell radio telephone like service that covers a whole town or city. Customers of this service are able to carry their mobile telecommunication units (telephone handsets) with them and can make calls in the coverage area of the service.

Within the public domain, there is a growing interest in replacing the wired local loop of the conventional Public Switch Telephone Networks (PSTN) and also the Integrated Services Digital Networks (ISDN) wired telephone systems by a so-called wireless local loop, i.e. using radio technology as an alternative for or as a replacement of the copper wires down to the subscriber premises. Within this concept of Radio in the Local Loop (RLL) two basic systems can be distinguished: Fixed RLL (FRLL) and Mobile RLL (MRLL). In the FRLL system, the subscriber is provided with an ordinary telephone socket, however connected to a radio transceiver, also called Fixed Access Unit (FAU) or Wireless Fixed Access Unit (WFAU). Via this FAU/WFAU a radio link is established with a so-called radio access unit, which provides access to the PSTN/ISDN. In the MRLL concept, the subscriber is provided with a portable cordless or mobile radio telephone handset, by which, via the radio access unit, direct access to the PSTN/ISDN can be established.

Mixed concepts are also possible, i.e. FRLL providing mobility in the subscriber premises, also called Cordless :In The Home (CITH) and residential or neighbourhood mobility, also called Cordless In The Neighbourhood (CITN). In some countries, governmental regulations prevent the established telephone operators from offering local mobility in the present PSTN/ISDN. In such cases, it is very advantageous for a second or third operator to offer both fixed and mobile or cordless access to the PSTN/ISDN. The radio access units of an RLL system are arranged to provide a local multi-cell radio telecommunication environment.

Conventional multi-cell radio telecommunication systems consist typically of a plurality of radio access units generally called base stations (BS) each providing service to a geographical area or cell, and central control units, also called radio exchanges (RE) or mobile telephone switching offices (MTSO), to which a number of base stations are connected. The MTSO and/or RE are in turn coupled to a PSTN/ISDN for completing transmissions, such as telephone calls, between cordless or mobile radio subscribers and landline subscribers.

In a multi-cell radio telecommunication system the total capacity of the system is specified in terms of the area covered by all the base stations together and the communication or call/ data processing capabilities of the combination of the central control unit and the base stations.

From a system functionalities point of view, the multi-cell radio system is comprised of a central processing functionality implemented in the central control unit and distributed functionalities in the several base stations. Interface functions are required both at the central control unit and the base stations to support the connection between the central control unit and the base stations.

A multi-cell cordless radio system of this type is disclosed by EP-A-0 637 144. The base stations, called Radio Fixed Part (RFP), connect to a battery of transcoders (TRAS) which transcoders connect to the PSTN through a Central Control Fixed Part (CCFP), via link lines L by means of Drop/Insert (DI) means.

In order to extend the range of a base station or to improve the link quality between a base station and a remote radio telecommunication terminal, called Portable Part (PP), repeater devices are disclosed, indicated by RIP. The repeater devices are operative at the radio air interface between a base station and a remote radio telecommunication terminal, using the same type of radio air interface and communication protocol, on the one hand, between the repeater device and the radio base station and, on the other hand, between the repeater device and the remote radio telecommunication terminal. The type of radio air interface and communication protocol disclosed is DECT.

In the known multi-cell radio telecommunication systems, the base stations are connected to the central control unit, i.e. the RE or MTSO, via copper wire cables, optical fibre cables or special purpose radio links, using proprietary or standardised interfaces and communication protocols, such as is the case of the pan-European GSM system.

For the air interface or radio link between the base stations and the remote radio telecommunication terminals such as the radio telephone handsets, interface protocols are used which are defined by the particular radio system such as DECT or GSM, for example.

SUMMARY OF THE INVENTION

In view of the foregoing background, it is an object of the invention to provide a wireless multi-cell radio telecommunication system eliminating the need for special interface protocols (proprietary and/or standardised) to support the base stations.

It is in particular an object of the present invention to provide a true wireless multi-cell radio telecommunication system eliminating the need for cables, connectors etc. between the central control unit and the base stations and which provides easy installation.

These and other objects, advantages and features of the present invention are provided by a wireless multi-cell radio telecommunication system, comprising a plurality of remote radio telecommunication terminals which connect through a radio air interface and communication protocol with a plurality of radio base stations, which radio base stations each provide radio communication service to a given area, called a cell, and connect to a central control unit. In use the central control unit connects to a communication switching network, such as a Public Switched Telephone Network (PSTN) or a Private Branch exchange (PBX). The connection between the base stations and the central control unit is established using the same type of radio air interface and communication protocol provided for the connections between the remote radio telecommunication terminals and the radio base stations. Therefor the central control unit is provided with interface functionality of a radio base station and the radio base stations are designed as a repeater or relay station.

The invention is based on the insight that optimization as to cost-effectiveness, flexibility and ease of installation can be achieved through using as much as possible the same interface and communication protocols between the several parts of a radio telecommunication system.

This is achieved, on the one hand, by adding to the central control unit appropriate interface functionalities of a radio base station, i.e. integration of interface functionalities and the central processing functionality of the central control unit, while on the other hand providing the base stations with a repeater functionality, such to transfer the data received from the central control unit in the same format to the remote radio telecommunication terminal in the coverage area, i.e. the cell of that base station.

With the present invention, the connection between the base stations and the central control unit can be provided as a radio connection, thereby eliminating the need for cables, their installation costs etc. At the same time, a central control unit provided with additional radio base station functionality can act itself as a radio base station, providing radio coverage in a particular cell.

The multi-cell radio telecommunication system according to the invention substantially reuses in an efficient and advantageous manner the radio interface that is used between the base stations and the remote terminals, thereby omitting the need for special connections, interfaces or other connection media.

The invention also relates to a central control unit for use in a multi-cell radio telecommunication system as disclosed above, having first interface means for connection to a communication switching network such as a Private Branch exchange (PBX) or a Public Switched Telephone Network (PSTN), characterized by common second air interface means for connection to at least on radio base station and/or remote telecommunication terminal.

In a preferred embodiment of the invention, the second interface is designed in accordance with the radio air interface between a base station and a remote radio telecommunication terminal according to the DECT standard.

The above-mentioned and other features and advantageous of the invention are illustrated in the following description with reference to the enclosed drawings.

DETAILED DESCRIPTION

Without the intention of a limitation, the invention will now be explained through a multi-cell radio telecommunication system operating according to the DECT (Digital Enhanced Cordless Telecommunications) standard.

DECT is the mandatory European standard for all digital cordless telecommunication systems, i.e. for use in business environments such as offices and in residential areas for providing a type of Personal Communication Service (PCS) as well as making over radio the final link or local loop between the subscribers and the local telephone network, also called Radio in the Local Loop (RLL). See also International Patent Application WO 94/19877, which application is herein included by reference.

Figure 1:
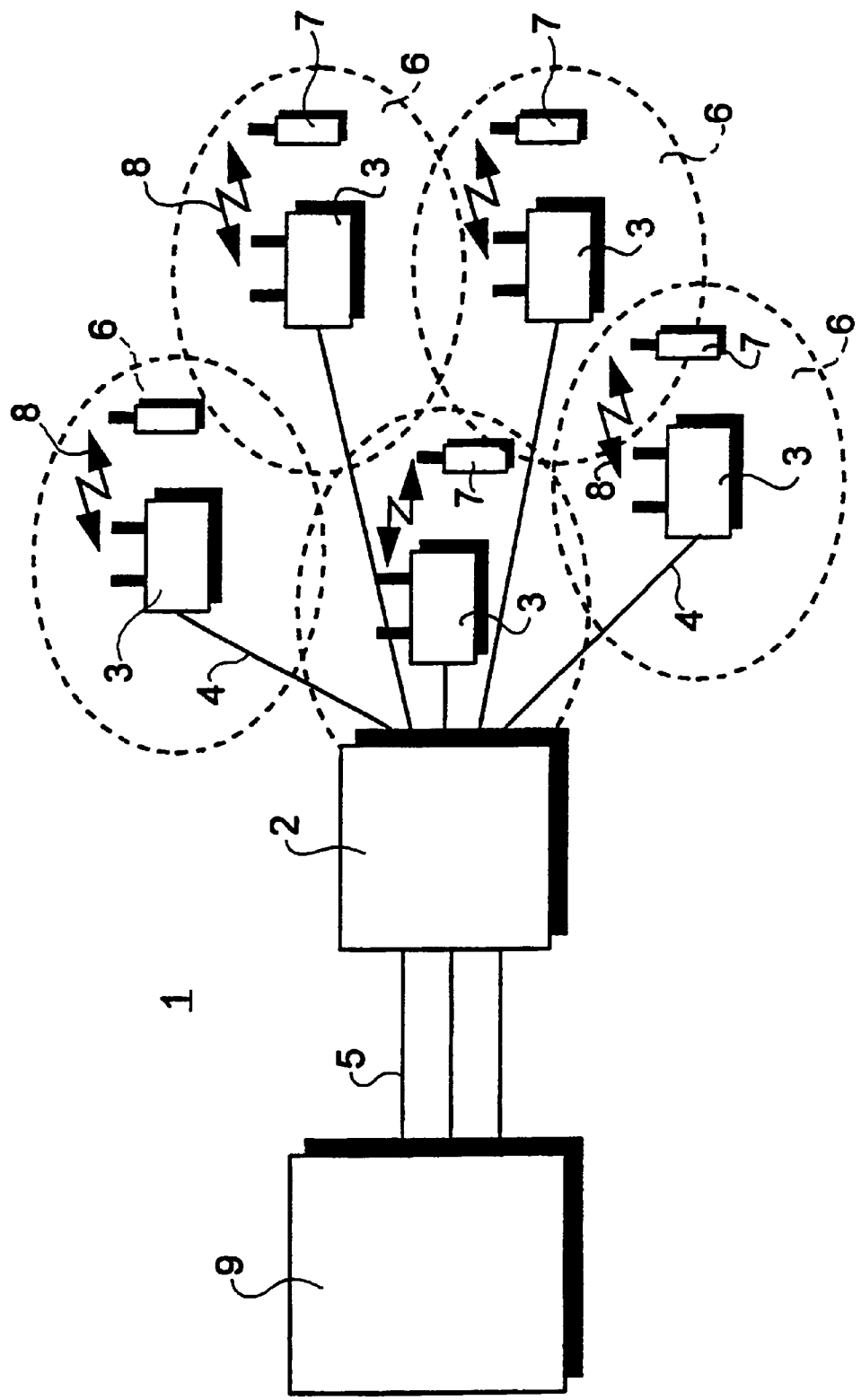
FIG. 1 shows, in a very schematic manner, a typical prior art multi-cell radio telecommunication system.

FIG. 1 illustrates a typical DECT multi-cell radio telecommunication system, generally designated with reference numeral 1. The system comprises three essential elements: a radio exchange (RE) or central control unit 2, a plurality of compact radio base stations 3, which are installed throughout the area to be covered and connect directly to the central control unit 2 through cables 4 and remote cordless or wireless portable telephones or handsets 7 which connect over a radio link 8 to the base stations 3. Each base station 3 provides service to a given area, called a cell 6, which is surrounded and/or overlapped by other cells 6 of other base stations 3, i.e. a so-called multi-cell approach. The radius of indoor cells amount typically from 10 m–100 m, whereas the radius of outdoor cells typically range from 200 m up to 5000 m.

Generally, each base station 3 and portable 7 comprises air interface means in the form of a transceiver unit, having a transmitter/modulator part and a receiver/demodulator part, both connected to at least one receive/transmit antenna. Further, transmission control and synchronization units are provided for establishing correct radio link transmissions. Received and transmitted speech information is processed under the control of a speech processing unit, to which one or several codecs are connected. In the portable 7 these codecs connect to a microphone and loudspeaker part at the user interface of the portable. Each base station 3 and portable 7 are provided with central processing means for controlling the overall operation of the base station or portable.

The central control unit radio exchange 2 is connected to a wired exchange 9 via lines 5. In business environments, this exchange 9 is generally a so-called Private Branch Exchange (PBX) whereas in outdoor applications such as RLL, the exchange 9 is generally a Local Exchange (LE) which, like the PBX, is connected to a Public Switched Telephone Network (PSTN), i.e. the ordinary wired public telephone network.

In RLL applications, the base stations 3 may also communicate with so-called remote (Wireless) Fixed Access Units ((W)FAU) which, like the portables 7, comprise an air interface, transmission and control units, central processing means and a speech processing unit. In fixed RLL, for example, the (W)FAU connects to a fixed telephone terminal or socket for the connection of an ordinary wired telephone.

Figure 2:
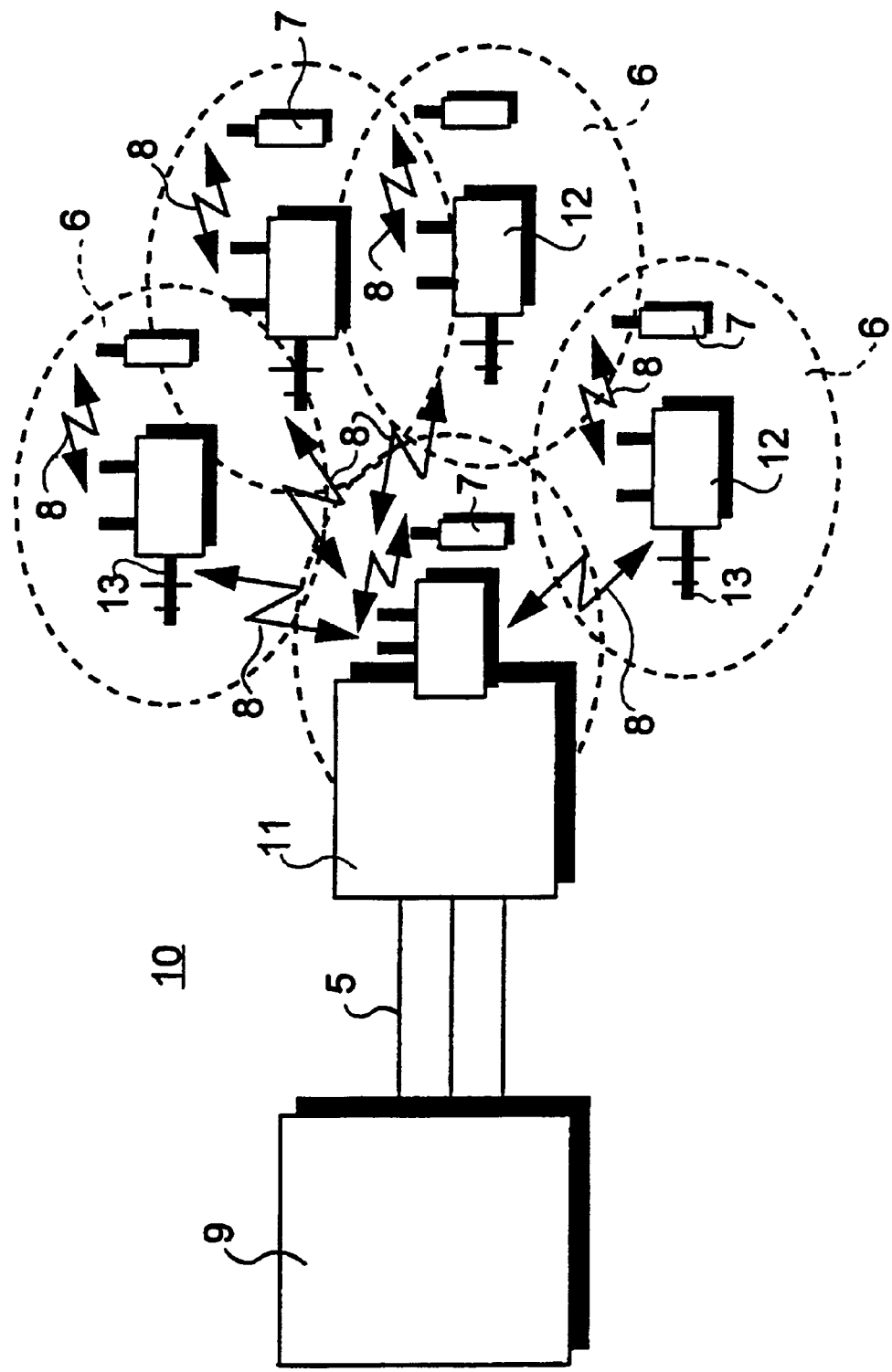
FIG. 2 shows, in a very schematic manner, a multi-cell radio telecommunication system according to the present invention.

FIG. 2 illustrates a wireless multi-cell radio telecommunication system according to the present invention, generally designated with reference numeral 10. An illustrated, the central control unit 2 of FIG. 1 is provided with the functionality of a radio base station 3, constituting a new unit 11, whereas the base stations 3 (FIG. 1) of a cell 6 are replaced by repeater or relay stations 12, having interface means 13 for connection to the unit 11. Is illustrated, this connection takes the form of a radio link 8 following the same interface and protocol requirements ads between the remote radio telecommunication terminals 7 and the relay stations 12; i.e. in accordance with the DECT standard.

In the embodiment shown, the unit 11 acts at the same time as a base-station having its own coverage cell 6.

The principle of wireless repeater or relay stations is described in International Patent Application WO 94/19877, which application is herein included by reference.

Although the present invention has been described with reference to a DECT telecommunication system, it will be understood that the novel arrangement according to the present invention can be used more generally in other cordless telecommunication systems, both indoor and outdoor, and the digital mobile cellular systems.

What is claimed is:

1. A wireless multi-cell radio telecommunication system, comprising a plurality of remote radio telecommunication terminals which connect through a radio air interface and communication protocol with a plurality of radio base stations, which radio base stations each provide radio communication service to a given area, called a cell, and connect to a central control unit that connects to a communication switching network, wherein the connection between the base stations and the central control unit is established using the same type of radio air interface and communication protocol provided for the connections between the remote radio telecommunication terminals and the radio base stations, the central control unit being provided with interface functionality of a radio base station and with additional radio base station functionality such to provide radio communication service in a particular cell, and the radio base stations are designed as a repeater station.

2. A radio telecommunication system according to claim 1, wherein the radio air interface and communication protocol operates in accordance with the Digital Enhanced Cordless Telecommunications (DECT) standard.

3. A central control unit for use in a multi-cell radio telecommunication system according to claim 1, comprising first interface means for connection to a communication switching network, therefor common second air interface means for connection to at least one radio base station and/or remote telecommunication terminal.

4. A central control unit according to claim 3, wherein the second radio air interface is designed in accordance with the radio air interface between a base station and a remote radio telecommunication terminal following the Digital Enhanced Cordless Telecommunication (DECT) standard.

* * * * *